United States Patent
Owens, Jr. et al.

(10) Patent No.: US 10,935,140 B2
(45) Date of Patent: Mar. 2, 2021

(54) MECHANISM FOR ASSEMBLING SPLIT SEAL RINGS

(71) Applicant: Flowserve Management Company, Irving, TX (US)

(72) Inventors: Glenn Robert Owens, Jr., Kalamazoo, MI (US); Rodney Wayne Rynearson, Kalamazoo, MI (US); Michael Anthony Kraus, McHenry, IL (US)

(73) Assignee: Flowserve Management Company, Irving, TX (US)

( * ) Notice: Subject to any disclaimer, the term of this patent is extended or adjusted under 35 U.S.C. 154(b) by 62 days.

(21) Appl. No.: 16/474,607

(22) PCT Filed: Jan. 10, 2018

(86) PCT No.: PCT/US2018/013131
§ 371 (c)(1),
(2) Date: Jun. 28, 2019

(87) PCT Pub. No.: WO2018/132451
PCT Pub. Date: Jul. 19, 2018

(65) Prior Publication Data
US 2020/0408307 A1 Dec. 31, 2020

Related U.S. Application Data

(60) Provisional application No. 62/445,276, filed on Jan. 12, 2017.

(51) Int. Cl.
*F16J 15/34* (2006.01)
(52) U.S. Cl.
CPC ....... *F16J 15/3488* (2013.01); *F16J 15/3404* (2013.01); *F16J 15/3452* (2013.01)

(58) Field of Classification Search
CPC ... F16J 15/3488; F16J 15/3404; F16J 15/3452
See application file for complete search history.

(56) References Cited

U.S. PATENT DOCUMENTS

| | | | |
|---|---|---|---|
| 1,485,128 A | 2/1924 | Small |
| 1,489,464 A | 4/1924 | Small |
| (Continued) | | | |

FOREIGN PATENT DOCUMENTS

| | | |
|---|---|---|
| EP | 0330762 A2 | 9/1989 |
| EP | 0658713 A1 | 6/1995 |
| (Continued) | | |

OTHER PUBLICATIONS

Office Action dated Apr. 14, 2020 for Canadian Patent Appl. No. 3,048,264, 2 pages.

(Continued)

*Primary Examiner* — Vishal A Patel
(74) *Attorney, Agent, or Firm* — Maine Cernota & Rardin

(57) ABSTRACT

An improved rotor or stator split ring seal assembly includes a flexible ring-advancing mechanism that advances at least one of the split ring halves radially inward, so that during assembly the split ring halves meet before adjacent elastomeric members, thereby preventing the elastomeric members from expanding between the seal ring halves and interfering with their alignment. The ring-advancing mechanism is flexed as the seal is assembled, thereby allowing the ring halves to be seated in the housing. The ring-advancing mechanism can be removable after assembly or internal to the seal. In various embodiments, the ring-advancing mechanism is a flexible bracket, a coil spring, or a vertical or horizontal leaf spring. Separate, identical ring-advancing mechanisms can be included with each of the housing halves so as to advance the split ring halves symmetrically.

15 Claims, 16 Drawing Sheets

(56) References Cited

U.S. PATENT DOCUMENTS

| | | | | |
|---|---|---|---|---|
| 3,101,200 | A | * | 8/1963 | Tracy .................. F16J 15/38 277/399 |
| 3,116,066 | A | * | 12/1963 | Koppins ................ F16J 15/38 277/397 |
| 4,533,149 | A | | 8/1985 | Vater et al. |
| 4,580,793 | A | | 4/1986 | Bronson |
| 4,659,092 | A | * | 4/1987 | Wallace .............. F16J 15/3468 277/360 |
| 5,067,733 | A | * | 11/1991 | Nagai ................ F16J 15/3488 277/370 |
| 5,556,110 | A | * | 9/1996 | Marsi ................ F16J 15/3464 277/397 |
| 5,913,521 | A | | 6/1999 | Sangren |
| 6,311,983 | B1 | * | 11/2001 | Burcham .............. F16J 15/002 277/370 |
| 8,894,292 | B2 | | 11/2014 | Yamakawa |
| 2002/0101038 | A1 | | 8/2002 | Budrow et al. |
| 2005/0265644 | A1 | | 12/2005 | Waseda |
| 2008/0001053 | A1 | | 1/2008 | Sandy |
| 2008/0246178 | A1 | | 10/2008 | Hashimoto |
| 2010/0230962 | A1 | | 9/2010 | Bongiorno |
| 2011/0064350 | A1 | | 3/2011 | Yamakawa et al. |
| 2011/0079961 | A1 | * | 4/2011 | Hoffmann ............ F16J 15/3476 277/500 |
| 2012/0112421 | A1 | | 5/2012 | Sato |
| 2012/0139186 | A1 | * | 6/2012 | Suefuji ................ F16J 15/36 277/377 |
| 2014/0159315 | A1 | | 6/2014 | Cid |
| 2014/0159316 | A1 | | 6/2014 | Cid et al. |
| 2015/0354583 | A1 | * | 12/2015 | Postuchow .......... F04D 29/146 415/113 |
| 2019/0186636 | A1 | | 6/2019 | Owens Jr. et al. |

FOREIGN PATENT DOCUMENTS

| | | |
|---|---|---|
| EP | 3513102 A1 | 7/2019 |
| EP | 3568620 A1 | 11/2019 |
| JP | 4002751 B2 | 11/2007 |
| JP | 4063610 B2 | 3/2008 |
| JP | 4576621 B2 | 11/2010 |
| WO | 2015061132 A1 | 4/2015 |
| WO | 2018052887 A1 | 2/2018 |
| WO | 2018132451 A1 | 7/2018 |

OTHER PUBLICATIONS

Foreign Office Action for European Patent Appl. No. 18739227.9, dated Jul. 2, 2020, 6 Pages.
International Preliminary Report on Patentability for Appl No. PCT/US2018/013131 dated Jul. 16, 2019, 9 Pages.
PCT Search Report and Written Opinion for Appl No. PCT/US2018/013131 dated Apr. 18, 2018, 13 pages.
Canadian Office Action for Appl No. 3032446 dated Dec. 7, 2019, 3 pages.
Foreign Office Action dated Jun. 9, 2020 for Canadian Appl. No. 3048264, 3 Pages.
Canadian Office Action for Appl No. 3048264 dated Dec. 13, 2019, 3 pages.
Office Action for U.S. Appl. No. 16/325,026, dated Jul. 27, 2020, 51 Pages.
Extended European Search Report for Application No. 18739227.9 dated Jan. 10, 2020, 6 pages.
International Preliminary Report on Patentability for Appl No. PCT/US2017/051123 dated Mar. 19, 2019, 10 pages.
International Search Report & Written Opinion for Appl No. PCT/US2017/051123 dated Dec. 22, 2017, 13 pages.
Canadian Office Action for Appl No. 3048264 dated Nov. 13, 2019, 3 pages.
Extended European Search Report for Application No. 17851391.7 dated Jan. 8, 2020, 8 pages.
Office Action for U.S. Appl. No. 16/325,026, dated Dec. 28, 2020, 16 Pages.

* cited by examiner

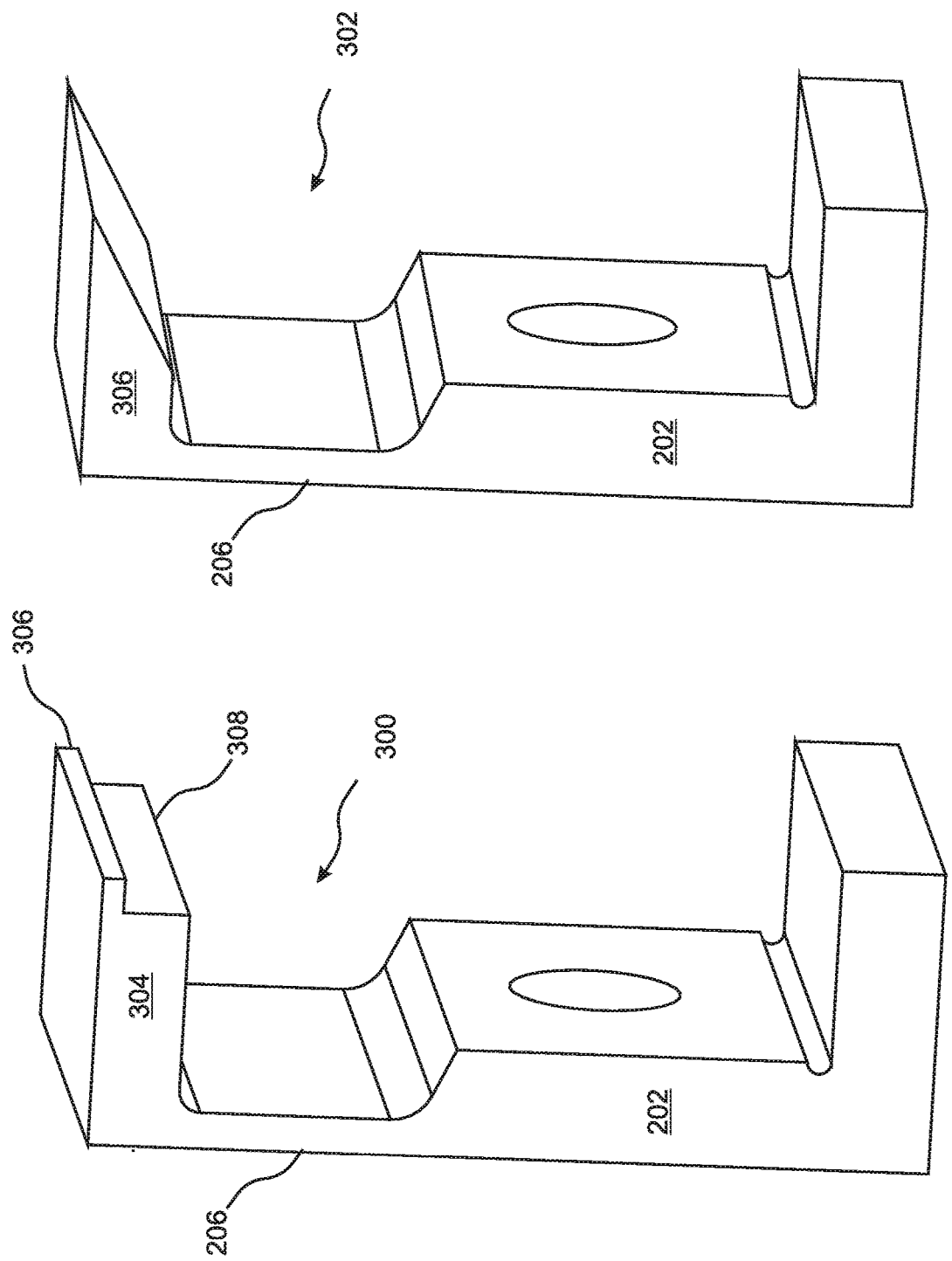

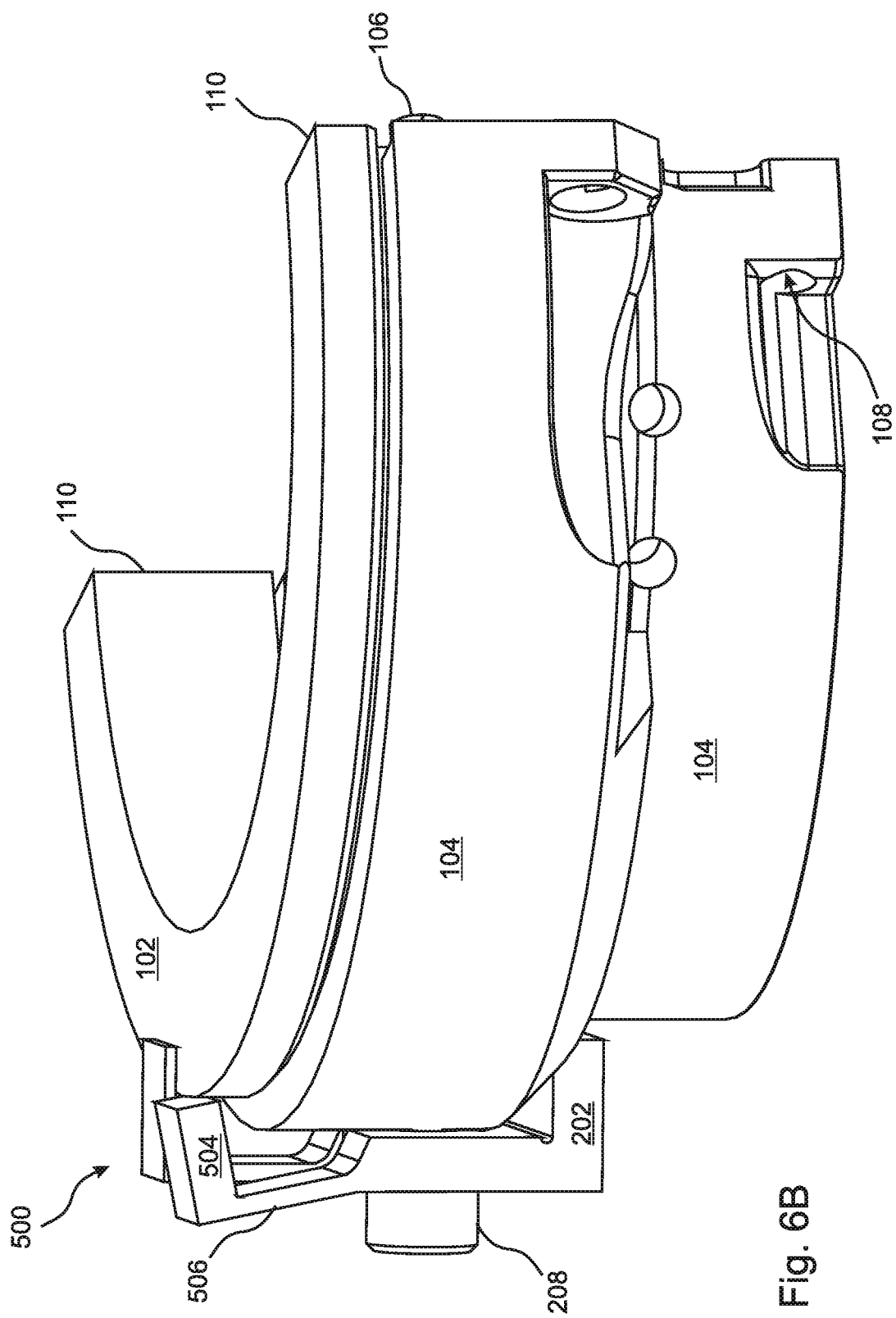

MECHANISM FOR ASSEMBLING SPLIT SEAL RINGS

RELATED APPLICATIONS

This application is a national phase application of PCT application No. PCT/US2018/013131 with an international filing date of Jan. 10, 2018. PCT application No. PCT/US2018/013131 claims the benefit of U.S. Provisional Application No. 62/445,276, filed Jan. 12, 2017. Both of these applications are herein incorporated by reference in their entirety for all purposes.

FIELD OF THE INVENTION

The invention relates to mechanical shaft seals, and more particularly, to split end face mechanical shaft seals.

BACKGROUND OF THE INVENTION

Mechanical shaft seals are used on a wide variety of machines, including pumps and the like, having rotating shafts that pass through housings. Typically, the mechanical seal is disposed in surrounding relationship to the shaft and creates a seal between the shaft and the housing by bringing two parallel, annular seal faces into sliding physical contact, where one of the seal faces is part of a stator seal ring fixed to the housing and the other seal face is part of a rotor seal ring that is rotationally fixed to the shaft. Normally, at least one of the seal rings (usually the stator ring) is axially slidable, and a positive pressure is maintained between the seal faces by a spring or other mechanism that presses the slidable ring toward the other ring. The seal rings are generally made from wear resistant materials such as silicon carbide. Nevertheless, the seal faces wear over time and require replacement.

Since installation or replacement of mechanical seals employing one-piece ring members is an extremely time consuming and complex operation, numerous assemblies with split ring members have been developed to facilitate installation and repair. Typically, the split ring members are formed by splitting one-piece ring members.

FIG. 1A is an illustration of a typical rotor split ring seal assembly 100, which includes a split seal ring 102 and corresponding split housing 104, as well as split elastomeric gaskets 106 that form seals between the split seal ring 102 and the housing 104, and between the housing 104 and a shaft (not shown) when the two halves of the assembly 100 are brought together. When assembled, the two halves are held together by bolts (not shown) that are inserted through holes 108 provided in the housings 104. Similar configurations apply to stator split ring seal assemblies.

While split ring seal assemblies 100 are recognized to possess highly desirable advantages, significant challenges frequently arise when reassembling them. Assembly of the two halves of a split ring seal assembly 100 typically involves installing the two seal ring halves 102 in corresponding half-sections of the housing or gland 104, which surrounds the shaft. As the two halves of the housing 104 are bolted together, the ends 110 of the split ring halves 102 are simultaneously pressed together.

One significant challenge when assembling a split ring seal 100 is to maintain the radial and axial alignment of the ends 110 of the split seal ring halves 102 with each other as they are brought together. Typically, the seal 100 is engineered to maintain a gap between the rotor and stator sealing faces 102 that is less than $10^{-5}$ inches wide, so any misalignment of the ends 110 of the split seal ring halves 102 will significantly increase process emissions and seal face wear. The most common approach is to simply rely on maintaining the split ring halves 102 rigidly in place in the housing sections 104, and then to use alignment features of the housing halves 104 to align the split ring halves 102. Unfortunately, this method is often insufficient.

Another approach is to configure the ends 110 of the split seal rings halves 102 with structural features that essentially "self-align" the ends 110 of the split ring halves. A solution of this type is disclosed in co-pending, related application U.S. 62/395,576, included herein by reference for all purposes, of which the first-named inventor of the present application is a co-inventor.

With reference to FIG. 1B, another significant challenge during assembly of a split-ring seal 100 arises from the fact that a split O-ring or similar split elastomeric sealing member 106 is typically located directly adjacent to the split ring halves 102, for example to form a seal between the seal ring 102 and the housing 104 and/or (in the case of a rotor seal assembly) between the housing 104 and the shaft. Due to the elastomeric nature of this sealing member 106, the ends thereof typically extend beyond the ends 110 of the split ring 102, such that as the split seal 100 is assembled, the ends of the elastomeric sealing members 106 meet and are compressed together before the ends 110 of the split ring 102 come into contact with each other, thereby causing a slight expansion in the widths of the sealing members 106. As a result, the O-ring or other elastomeric sealing member 106 can sometimes expand into the gaps 112 between the ends 110 of the split rings 102, thereby interfering with the proper alignment and closure of the seal ring halves 102.

Typically, when this happens it is necessary to disassemble and reassemble the split seal, possibly more than once, until by chance this intrusion of the sealing member between the ends of the split ring is avoided. However, this can be a frustrating and time-consuming process.

What is needed, therefore, is an improved split seal design that maintains alignment of the split seal ring halves during assembly of the split seal while preventing an adjoining split elastomeric sealing member from interfering with closure and alignment of the split seal ring halves due to expansion of the elastomer into the space between the ends of the split seal ring halves.

SUMMARY OF THE INVENTION

An improved seal ring advancing mechanism and split ring seal assembly design are disclosed that prevent an adjoining split elastomeric sealing member from expanding into the space between the ends of the split seal ring halves and interfering with closure and alignment of the split seal ring halves.

The disclosed seal-advancing mechanism includes a flexible alignment component that advances at least one of the halves of the split seal ring radially inward, so that the ends of the split ring halves are brought into contact with each other before the ends of the split elastomeric sealing member, thereby preventing the elastomer from entering a gap between the ends of the seal ring halves when the elastomer is subsequently compressed. As the housing and other components of the split seal are brought together, the flexible alignment component is flexed, so that the two halves of the split seal ring remain in a fixed, joined relationship while the two halves of the remainder of the split ring seal assembly are moved radially inward toward each other until they are also mated together.

In embodiments, each half of the split ring seal assembly includes a flexible alignment component, so that during assembly the two halves of the split seal ring are advanced toward each other symmetrically. In some embodiments, the spring-like component is a bendable bracket. In other embodiments, the spring-like component is a conventional spring, such as a coil spring or a leaf spring.

In some embodiments, the spring-like component is permanently installed as a component of the split ring seal assembly, while in other embodiments it is removable after the split ring seal assembly has been fully assembled.

A first general embodiment of the present invention is a split ring advancing mechanism for assembling a split ring seal assembly that is radially distributed about a central axis thereof, where the split ring seal assembly includes a housing that is split into first and second housing halves, and a seal ring that is split into first and second split ring halves, the first and second housing halves including respective first and second ring seat halves into which the first and second split ring halves can be respectively seated, the split ring seal assembly further including an elastomeric sealing member split into first and second elastomeric halves that form seals respectively between the first ring half and first housing half, and between the second ring half and the second housing half. According to this first general embodiment, the split ring advancing mechanism includes a flexible alignment component attachable to an exterior of the first housing half and configured to shift the first split ring half radially inward while the first split ring half remains axially seated in the first ring seat half, so that ends of the first split ring half extend circumferentially beyond corresponding ends of the first elastomeric half, the flexible alignment component being flexible so as to allow the first split ring half to move radially outward into a radially seated configuration as the first and second housing halves are assembled.

A second general aspect of the present invention is a mechanism configured as a split ring seal assembly. The mechanism includes a seal ring that is split into first and second split ring halves, a housing that is split into first and second housing halves, the housing halves including respective first and second ring seat halves into which the seal ring halves can be respectively seated, an elastomeric sealing member split into first and second elastomeric halves that form seals respectively between the first ring half and first housing half, and between the second ring half and the second housing half, and a split ring advancing mechanism comprising a flexible alignment component cooperative with the first housing half and configured to shift the first split ring half radially inward while the first split ring half remains axially seated in the first ring seat half, so that ends of the first split ring half extend circumferentially beyond corresponding ends of the first elastomeric half, the flexible alignment component being flexible so as to allow the first split ring half to move radially outward into a radially seated configuration as the first and second housing halves are assembled.

In either of these general aspects, the flexible alignment component can be removable from the first housing half after assembly of the first and second housing halves.

In an preceding embodiment of either of these general aspects, the flexible alignment component can include a base that is attachable to an exterior of the first housing half, a flexible neck extending upward from the base, and a head that is configured to push radially inward against an outer rim of the first split ring half. In some of these embodiment, the head includes a projection that is configured to extend over a top of the first split ring half and thereby maintain the first split ring half axially seated in the first ring seat half. And in any of these embodiments, the head can include a beveled front surface configured to press the first split seal ring half simultaneously in a radially inward and an axially downward direction. In any of these embodiments, the head and neck can be split vertically into two halves. And in some of these embodiments, one of the two halves of the head is configured to maintain the first split ring half axially seated in the first ring seat half while the other of the two halves of the head is configured to push the first split seal ring half radially inward.

In either of the first and second general aspects, including embodiments where the flexible alignment component is removable from the first housing half after assembly of the first and second housing halves, the flexible alignment component can extend within a space between an outer rim of the first split seal ring half and an inner wall of the first ring seat half. In some of these embodiments, the flexible alignment component is a coil spring. In other of these embodiments, the flexible alignment component is a vertical leaf spring. In still other of these embodiments, the flexible alignment component is a horizontal leaf spring.

Any of the preceding embodiments of either of the two general aspects can further include a second flexible alignment component cooperative with the second housing half.

In any of the preceding embodiments of either of the two general aspects, the split ring seal assembly can be a rotor split ring seal assembly or a stator split ring assembly.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3A is a side perspective view drawn to scale of a flexible alignment component in an embodiment similar to FIG. 2A that includes a head with an axially limiting extension;

FIG. 3B is a side perspective view drawn to scale of a flexible alignment component in an embodiment similar to FIG. 2A that includes a head with a beveled pushing edge;

FIG. 6B is a perspective sectional view drawn to scale of a split seal ring assembly in an embodiment of the present invention that includes the flexible alignment member of FIG. 6A, shown in an assembled configuration;

DETAILED DESCRIPTION

The present invention is an improved seal ring advancing mechanism and split ring seal assembly design that prevent an adjoining split elastomeric sealing member from expanding into the space between the ends of the split seal ring halves and interfering with closure and alignment of the split seal ring.

The disclosed seal-advancing mechanism includes a flexible alignment component that advances at least one of the halves of the split seal ring radially inward, so that the ends of the split ring halves are brought into contact before the ends of the split elastomeric sealing member, thereby preventing the elastomer from entering a gap between the ends of the seal ring halves when the elastomer is subsequently compressed. As the housing and other components of the split seal are brought together during assembly, the flexible alignment component is flexed, so that the two halves of the split seal ring remain in a fixed, joined relationship while the two halves of the remainder of the split ring seal assembly are moved radially inward toward each other until they are also mated together.

Figure 1A:
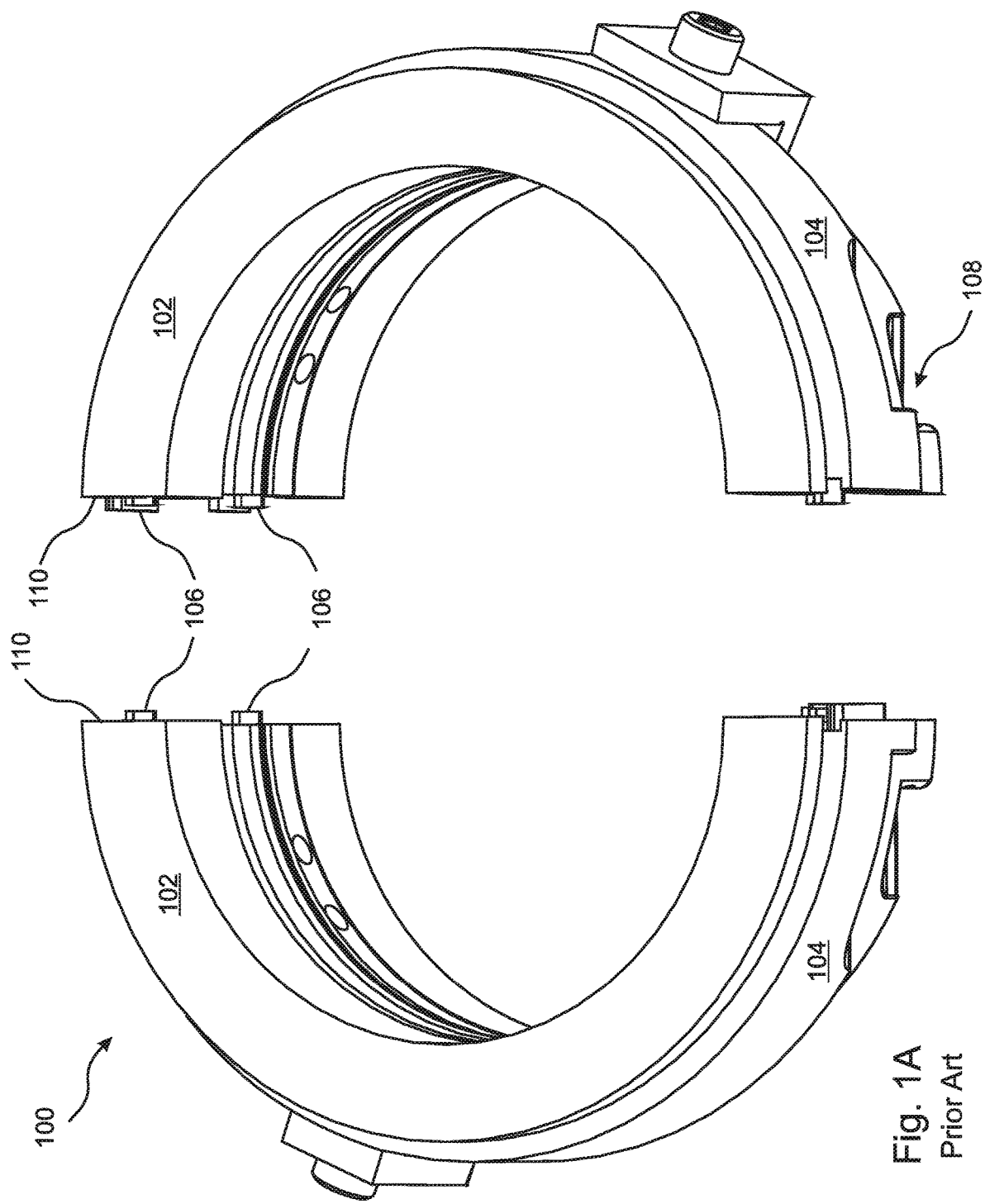
FIG. 1A is an upper perspective view drawn to scale of separated halves of a split ring seal assembly according to the prior art.
Figure 1B:
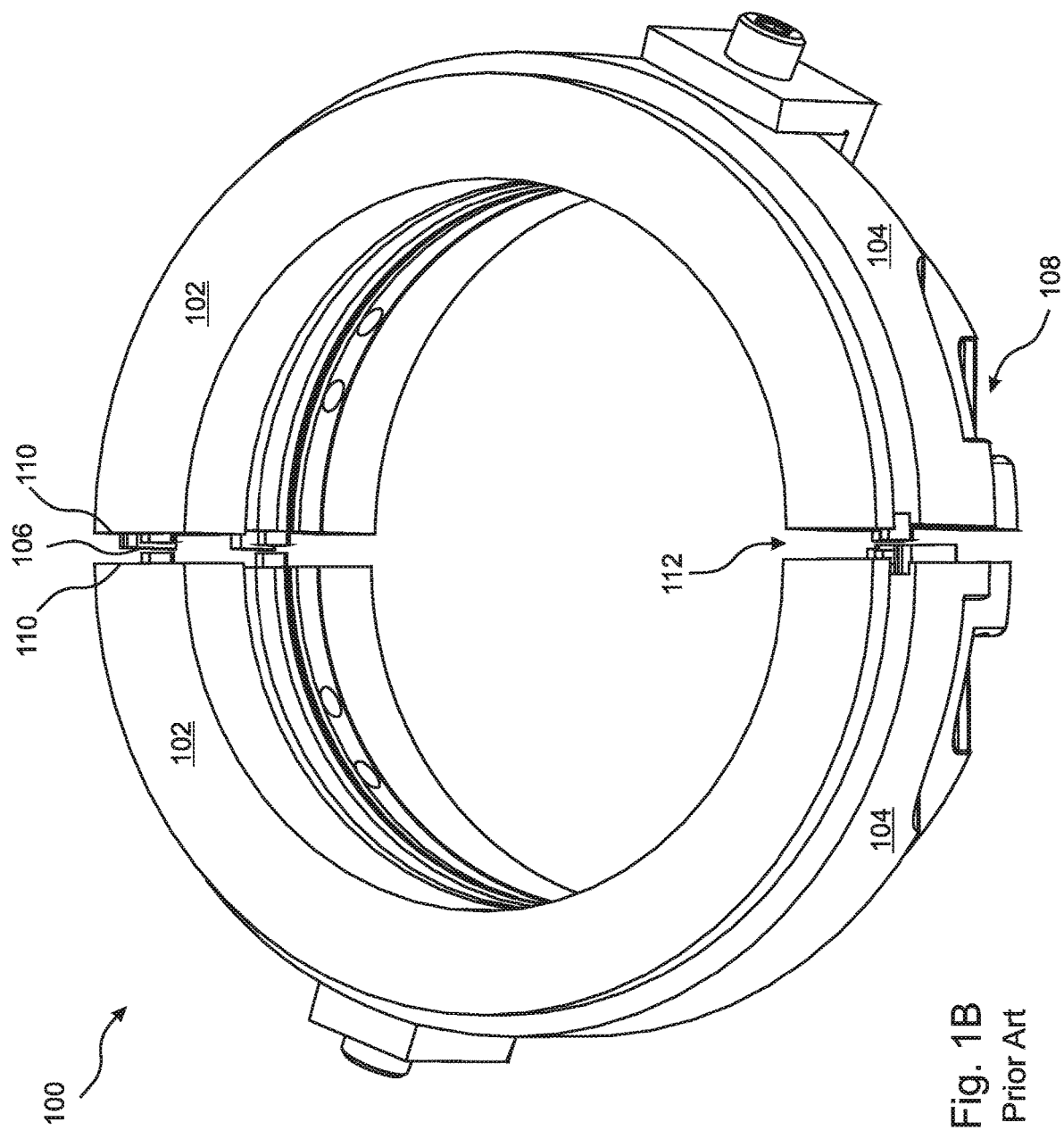
FIG. 1B is an upper perspective view drawn to scale of the split ring seal assembly of FIG. 1A shown partially assembled.
Figure 2A:
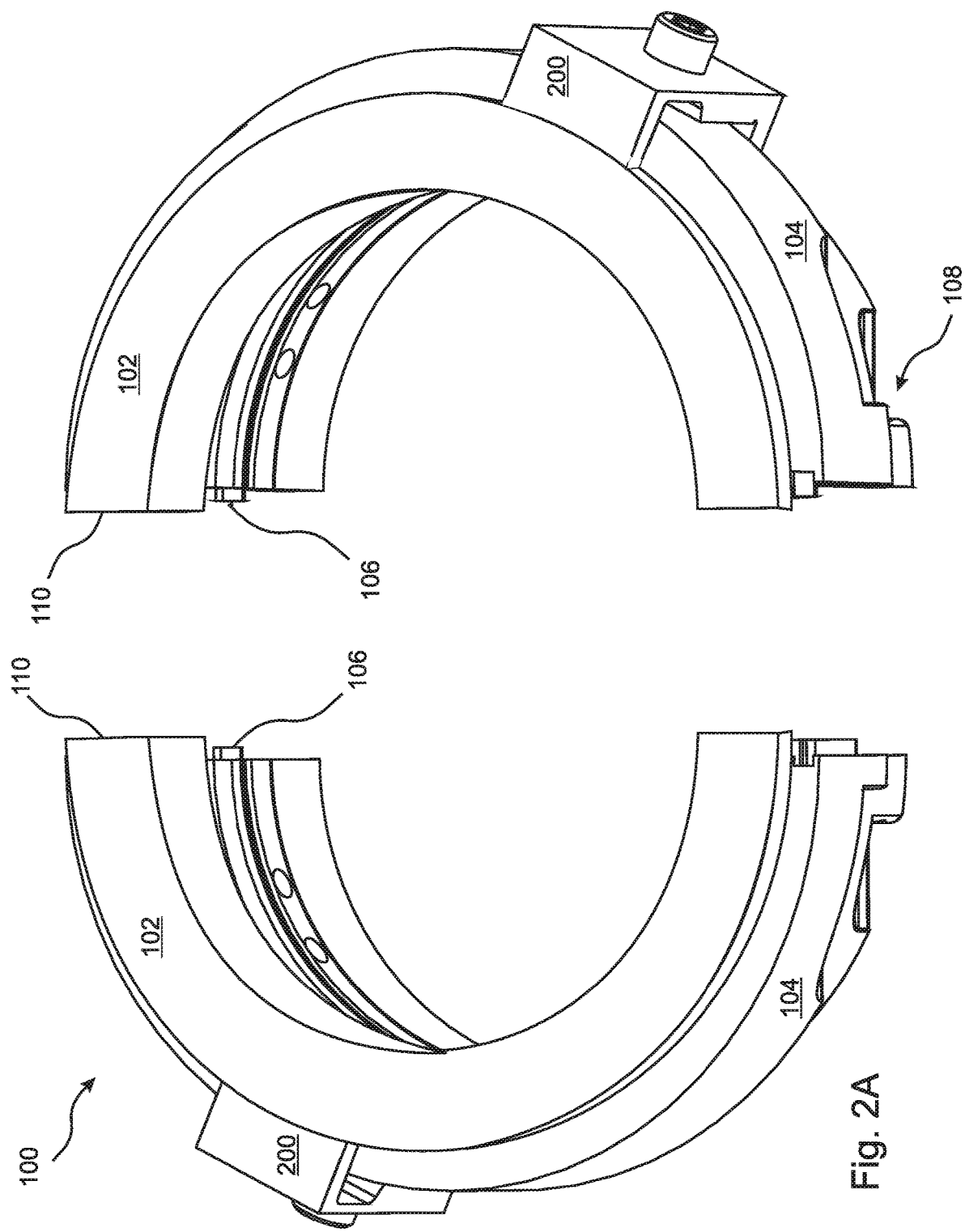
FIG. 2A is an upper perspective view drawn to scale of separated halves of a split ring seal assembly in an embodiment of the present invention.

FIG. 2A is a perspective view from above of a rotor split ring seal assembly 100 according to an embodiment in which the flexible alignment components 200 are a pair of brackets that are attached to each of the housing halves 104 of the split seal assembly 100. As can be seen in the figure, the split seal ring halves 102 are pushed radially inward relative to the housing halves 104 by the flexible alignment components 200 of the brackets, so that the ends 110 of the split seal ring halves 102 extend beyond the ends of the elastomeric sealing members 106.

Figure 2B:
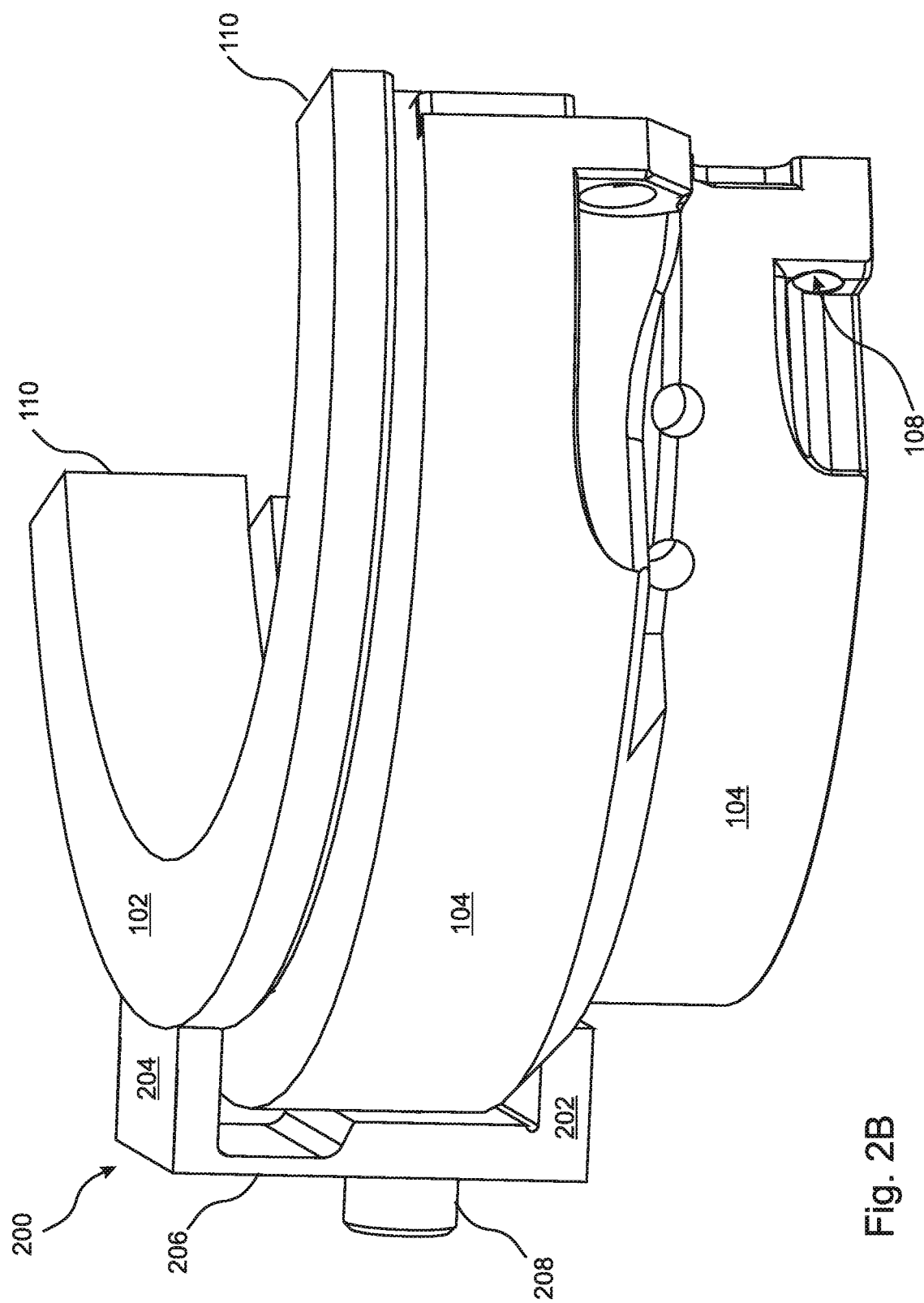
FIG. 2B is a side perspective view drawn to scale of one half of the split ring seal assembly of FIG. 2A, shown in a pre-assembled configuration.

The structure of the flexible alignment components 200 in this embodiment is more readily discerned in FIG. 2B, which is a perspective view of one half of the split ring seal assembly 100 of FIG. 2A shown from the side. It can be seen in this view that the flexible alignment component 200 includes a rigid base 202 that is attached to the side of the housing 104 by a bolt 208. The flexible alignment component 200 further includes a top section or "head" 204 that is positioned against an outer edge of the split seal ring 102 that extends above the housing 104. The head 204 of the alignment component 200 is connected to the rigid base 202 by a flexible neck 206.

Figure 2C:
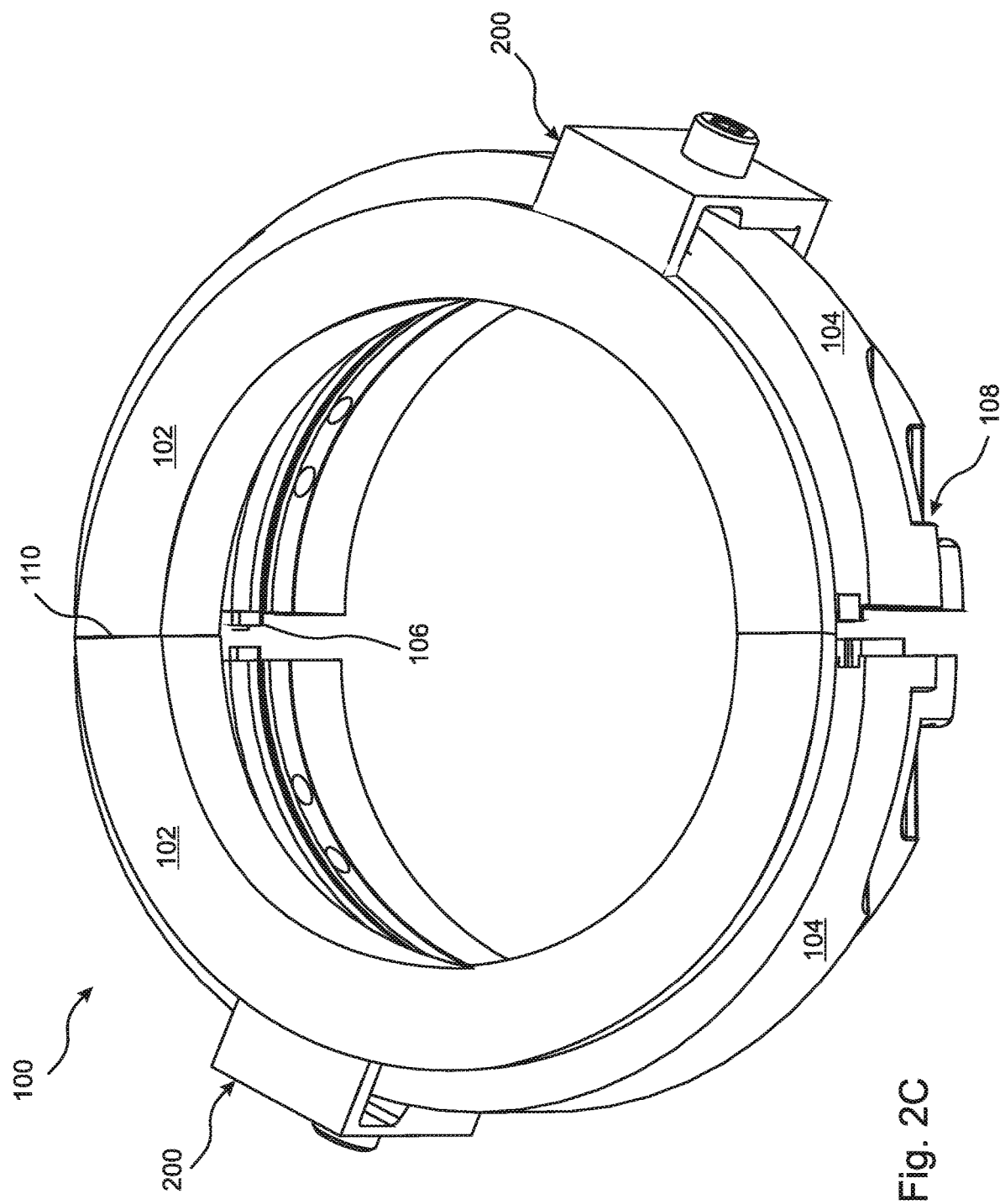
FIG. 2C is an upper perspective view drawn to scale of the split ring seal assembly of FIG. 2A shown partially assembled.

The effect of the flexible alignment components 200 is illustrated in FIG. 2C, which is similar to FIG. 2A, but which shows the two halves of the split ring seal assembly 100 having been moved toward each other until the ends 110 of the split seal rings 102 have made contact. As can be seen in the figure, the ends of the elastomeric members 106 have not yet made contact, and so any tendency for the elastomeric members 106 to be pressed into the gap 112 between the split seal ring halves 102 has been avoided.

FIGS. 3A and 3B are side perspective views of flexible alignment components 300, 302 from two embodiments that are similar to FIGS. 2A-2C. In the embodiment of FIG. 3A, the head 304 of the flexible alignment components 300 includes an extension 306 that rests on top of the split seal ring 102 and holds it against the housing 104 while the lower portion 308 of the head 304 pushes the split ring 102 radially inward during assembly of the housing halves 104. In the embodiment of FIG. 3B, the head 306 of the flexible alignment component 302 is beveled, so that the split seal ring 102 is pressed downward toward the housing 104 as the housing halves 104 are assembled.

Figure 4A:
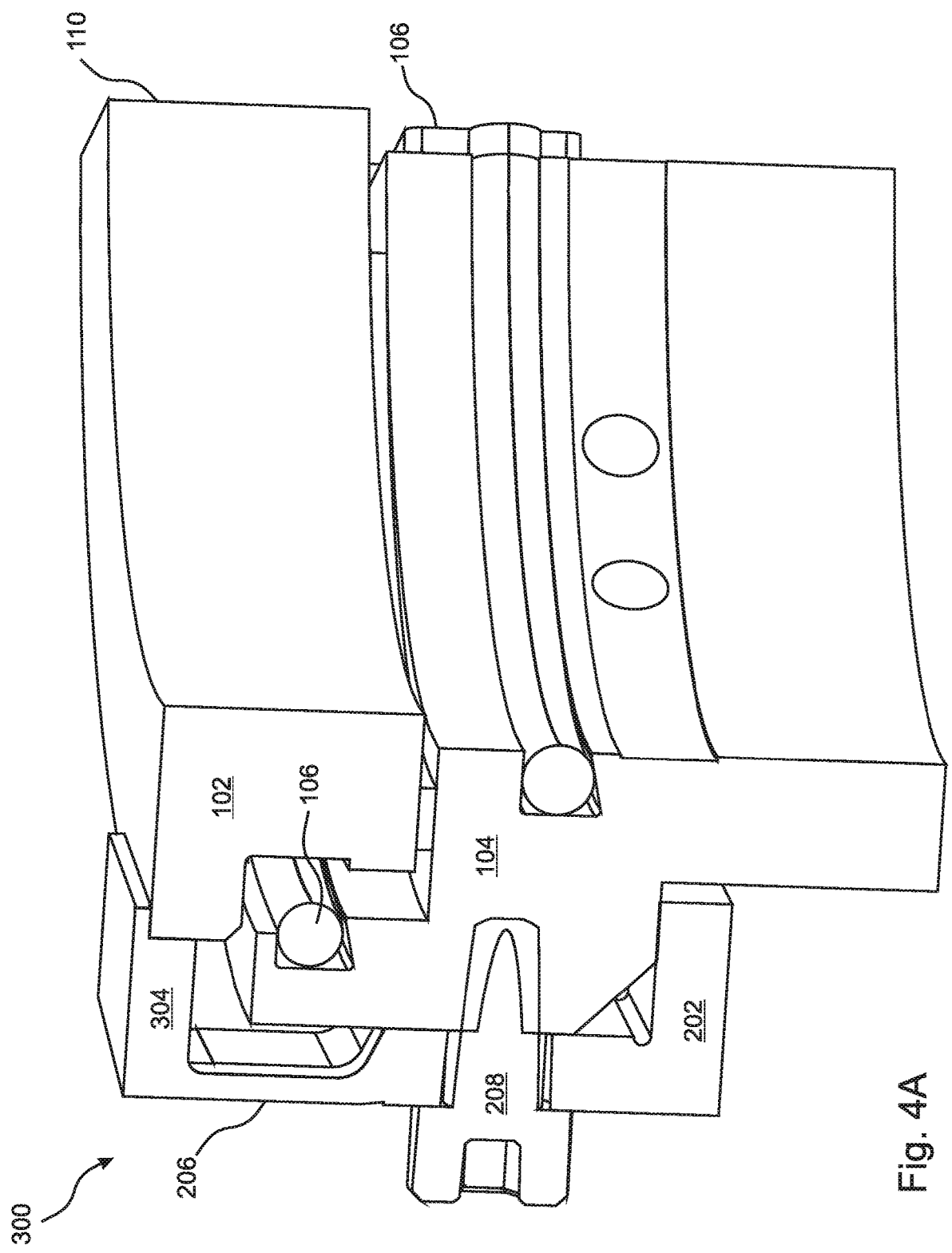
FIG. 4A is a perspective sectional view drawn to scale of a split seal ring assembly in an embodiment of the present invention that includes the flexible alignment member of FIG. 3A, shown in a pre-assembled configuration.

FIG. 4A presents a perspective, sectional view of one half of a split ring seal assembly 100 that includes the flexible alignment component 300 of FIG. 3A. In the figure, the housing halves 104 have not yet been assembled, and it can be seen that the flexible alignment component 300 has pushed the split seal ring half 102 radially forward, such that the ends 110 of the split seal ring half 102 extend beyond the ends of the elastomeric members 106.

Figure 4B:
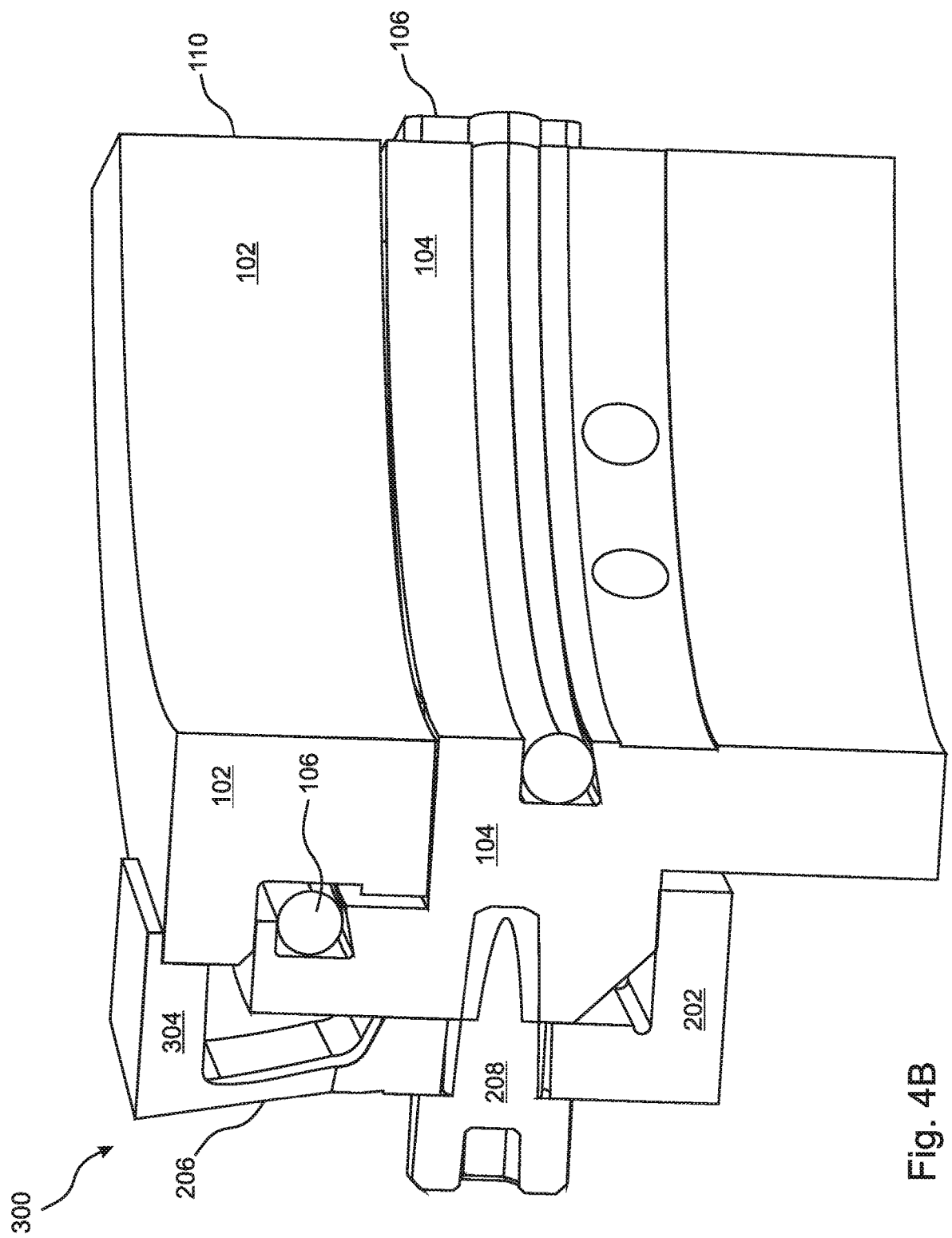
FIG. 4B is a perspective sectional view drawn to scale of the split seal ring assembly of FIG. 4A, shown in an assembled configuration.

FIG. 4B is a perspective sectional view of the embodiment of FIG. 4A after it has been assembled with the other half of the split ring seal assembly (not shown). It can be seen in the figure that the end 110 of the split seal ring 102 has been pushed back into alignment with the end of the split housing 104, and that the flexible neck 206 of the flexible alignment component 300 has been bent back so as to accommodate this radially outward shift of the split ring 102 half relative to the housing half 104.

Figure 5A:
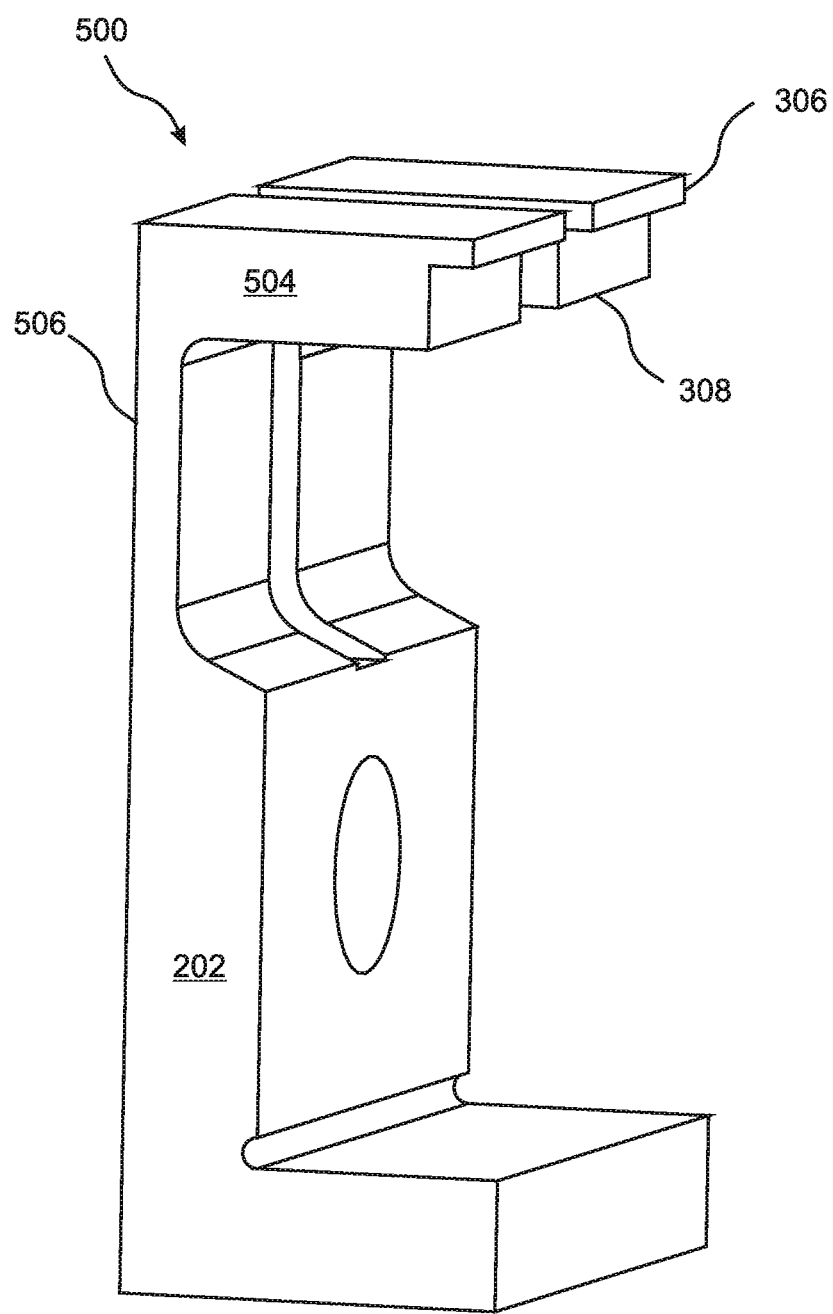
FIG. 5A is a perspective side view drawn to scale of a flexible alignment member in an embodiment of the present invention for which the head is vertically split into two identical halves.
Figure 5B:
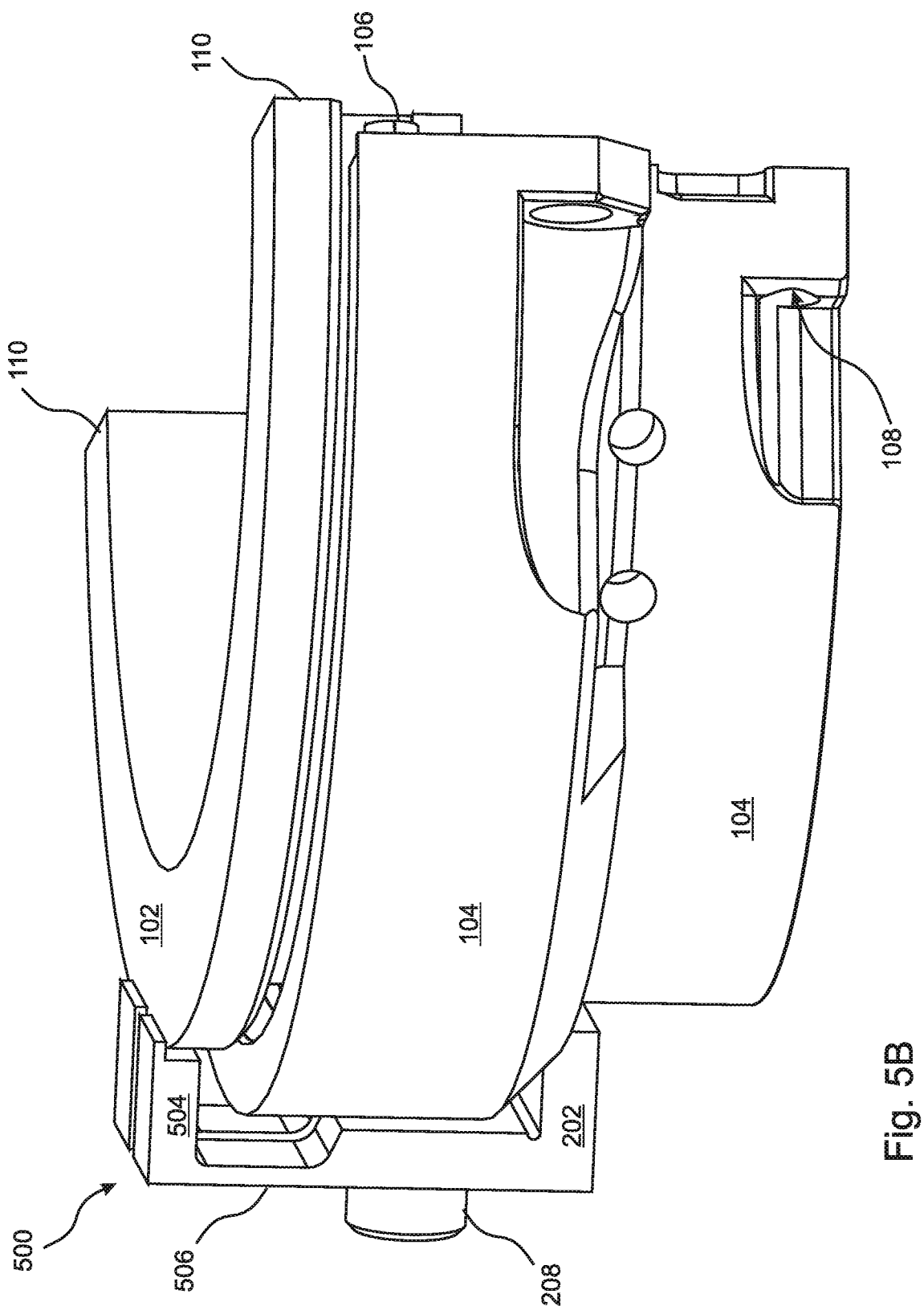
FIG. 5B is a perspective sectional view drawn to scale of a split seal ring assembly in an embodiment of the present invention that includes the flexible alignment member of FIG. 5A, shown in a pre-assembled configuration.

FIG. 5A is a perspective side view of a flexible alignment component 500 similar to FIG. 3A, but for which the head 502 is split into two halves, thereby increasing the bendability of the flexible neck 506. FIG. 5B is a side perspective view of the flexible alignment component of FIG. 5A installed on a housing half 104.

Figure 6A:
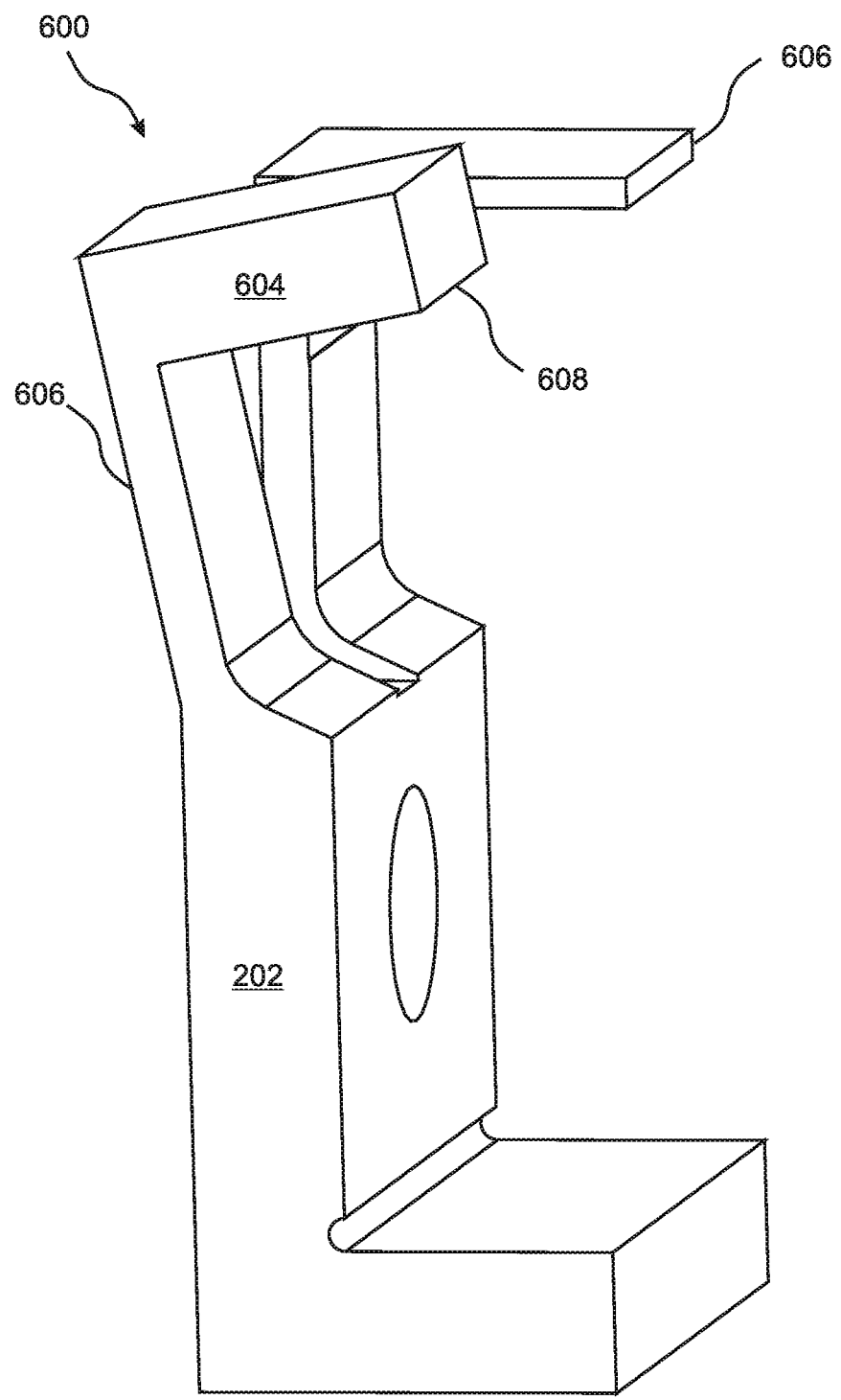
FIG. 6A is a perspective side view drawn to scale of a flexible alignment member in an embodiment of the present invention for which the head is vertically split into two halves that perform different functions.

FIG. 6A is a perspective side view of a flexible alignment component 600 in an embodiment that is similar to FIG. 5A, except that the two halves 606, 608 of the head 604 of the flexible alignment component 600 perform different functions. According to this embodiment, one half 606 of the head 604 extends over the top of the split ring 102 and maintains its axial position during assembly, while the other half 608 pushes the split ring 102 radially inward. The flexible alignment component 600 is shown it its "flexed"

configuration, whereby only the pushing "half" 608 of the head 604 is bent back by the radially outward shifting of the split ring 102.

FIG. 6B is a side perspective view of the flexible alignment component 600 of FIG. 6A installed on a housing half 104, shown in the assembled configuration with the pushing half 608 of the flexible alignment component 600 bent back.

Figure 7A:
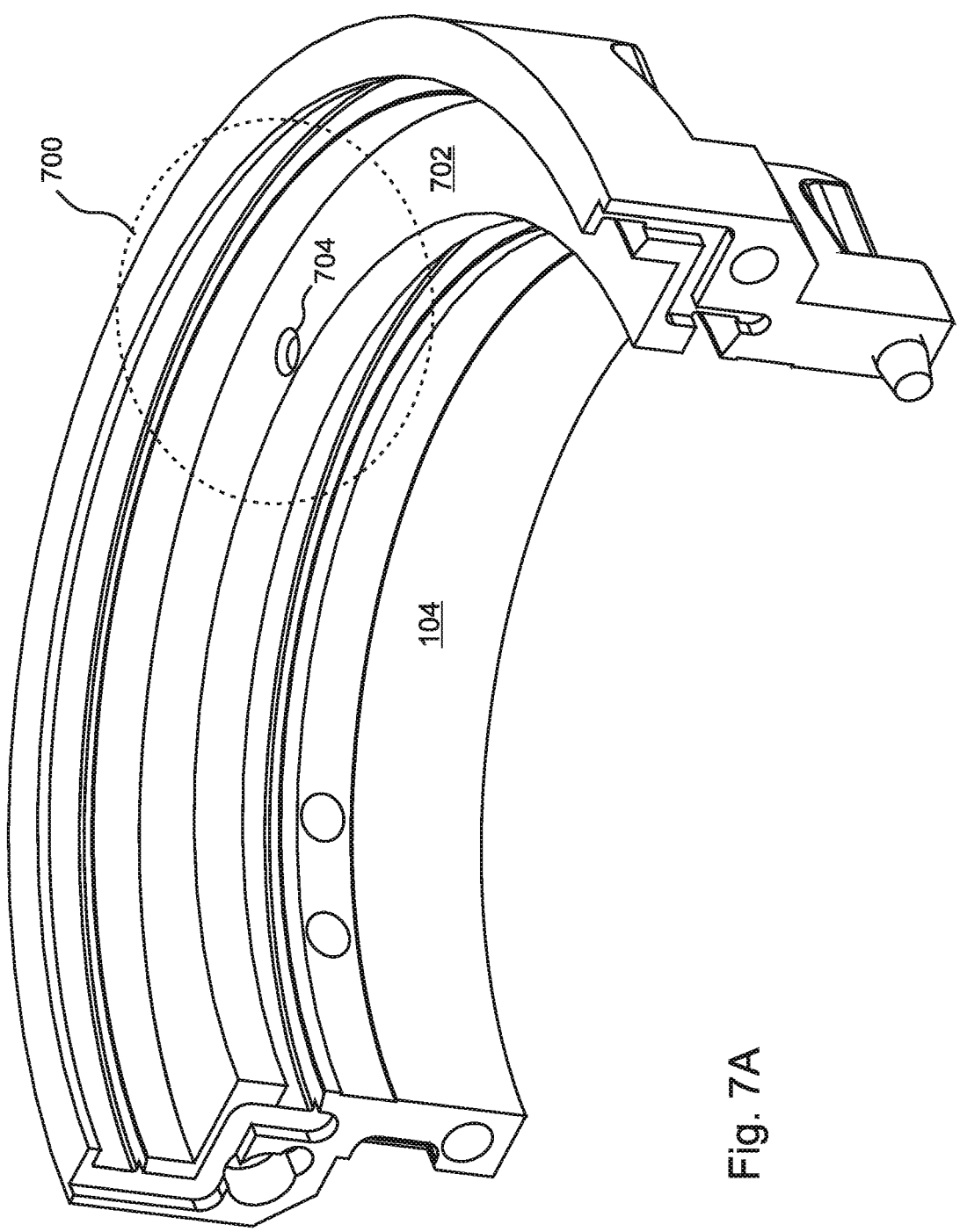
FIG. 7A is a perspective view drawn to scale of a housing half included in various embodiments of the present invention.

In the embodiments of FIGS. 2A through 6B, the flexible alignment component is a flexible bracket that is attachable to the exterior of the split seal housing 104 and can be removed after the split ring seal is assembled. In other embodiments, the flexible alignment component is internal to the split ring seal assembly, and is not removed after assembly. In some of these embodiments, the flexible alignment component is a conventional spring, such as a coil spring or a leaf spring. FIG. 7A is a perspective view of a split seal housing 104 shown with the split seal ring 102 removed from its seat 702. The dotted line 700 in the figure indicates a region that is expanded in FIGS. 7B through 7D. The hole 704 in the seat 702 is configured to hold an orienting pin, and is included in FIG. 7A primarily as a reference feature for FIGS. 7B through 7D

Figure 7B:
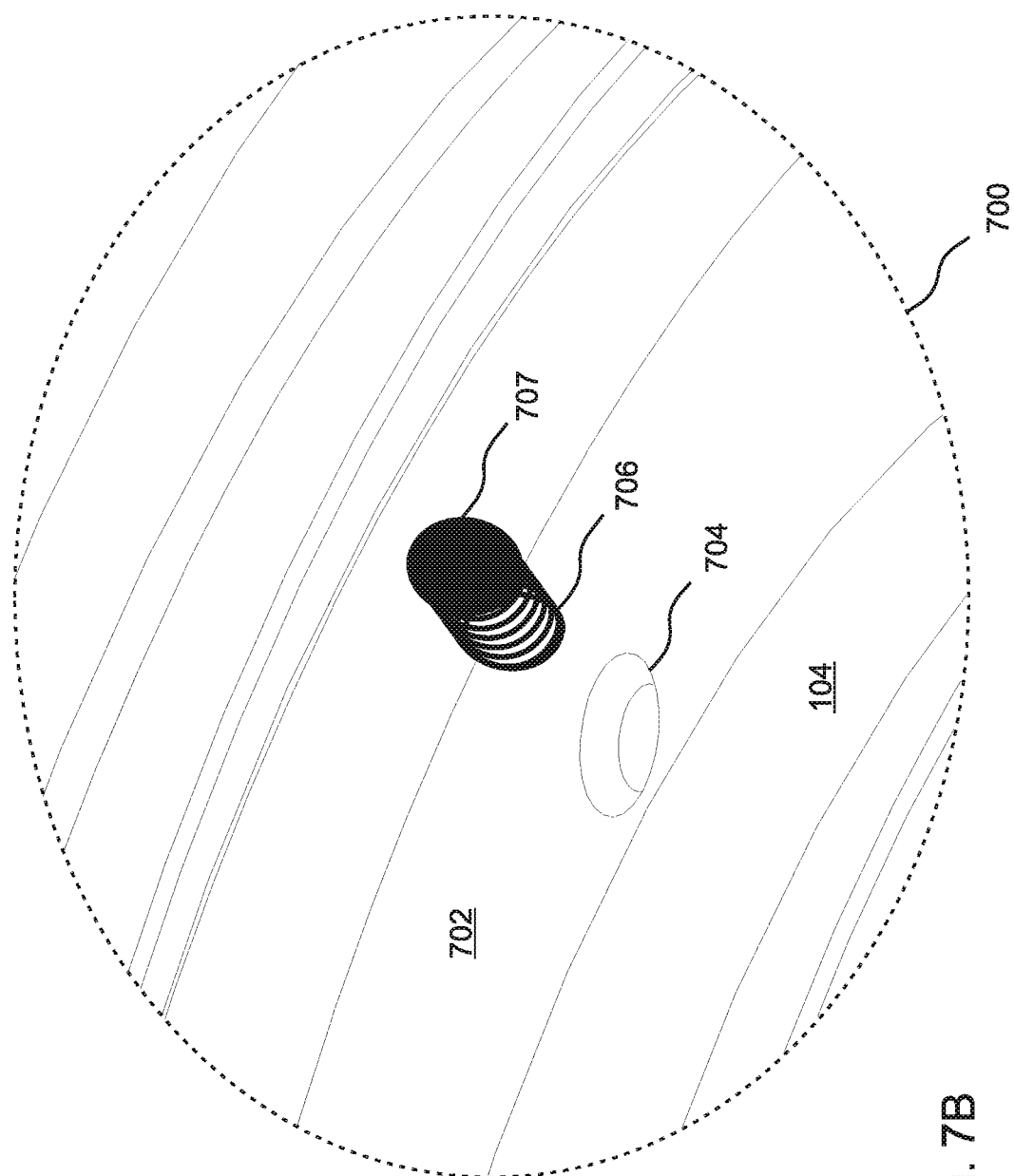
FIG. 7B is a perspective close-up view drawn to scale of a region of the housing half of FIG. 7A showing a spring-like component installed therein, where the flexible alignment member is a coil spring.

FIG. 7B is a close-up perspective view of the expanded region 700 of FIG. 7A in an embodiment where the flexible alignment component is a coil spring 706 that extends radially inward through a hole 707 in the side wall of the split ring seat 702. The coil spring 706 pushes the split ring 102 radially inward, and then as the split ring seal is assembled, the coil spring 706 is compressed into the hole 707 within the seat 702.

Figure 7C:
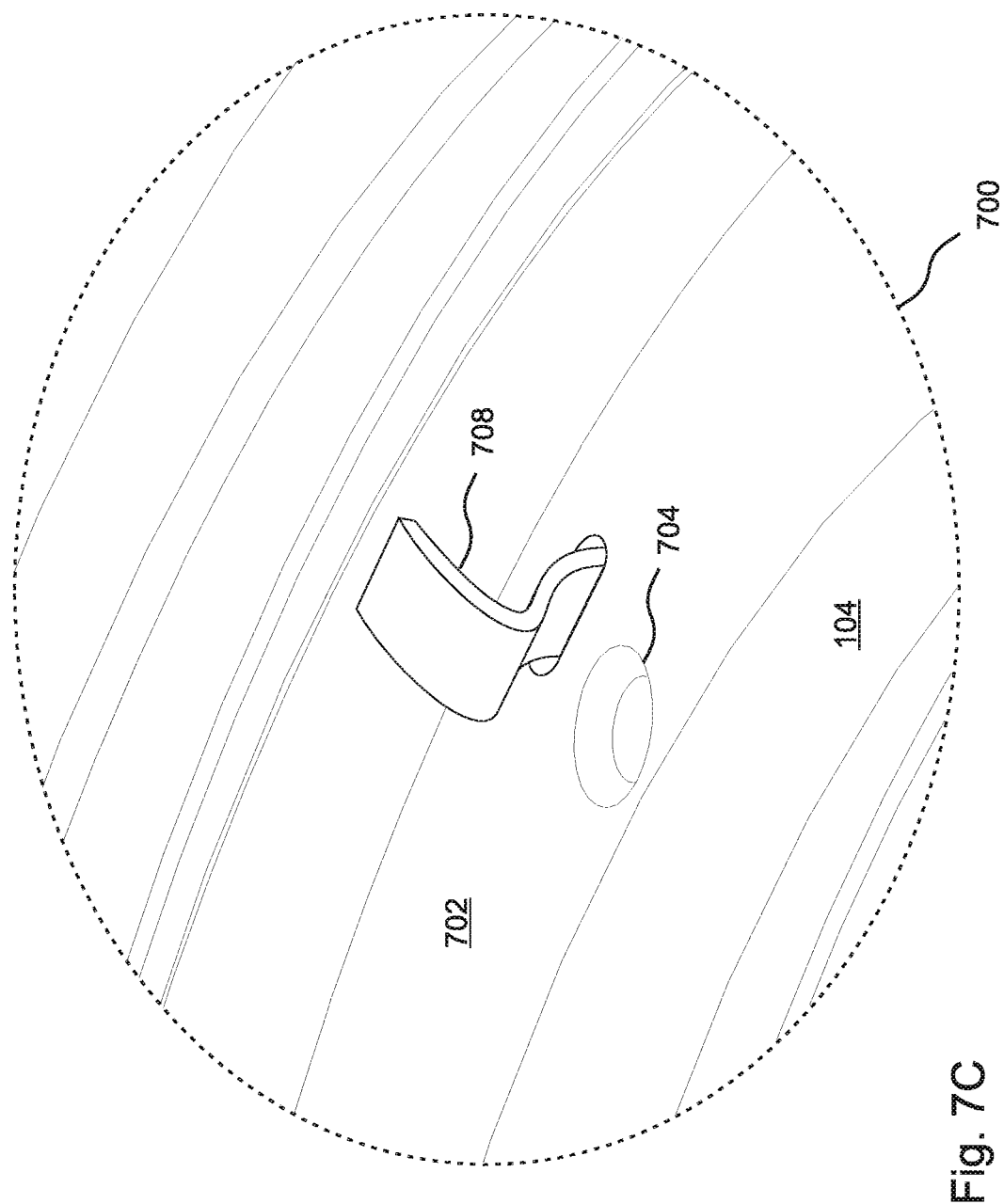
FIG. 7C is a perspective close-up view drawn to scale of a region of the housing half of FIG. 7A showing a spring-like component installed therein, where the flexible alignment member is a bent vertical leaf spring.
Figure 7D:
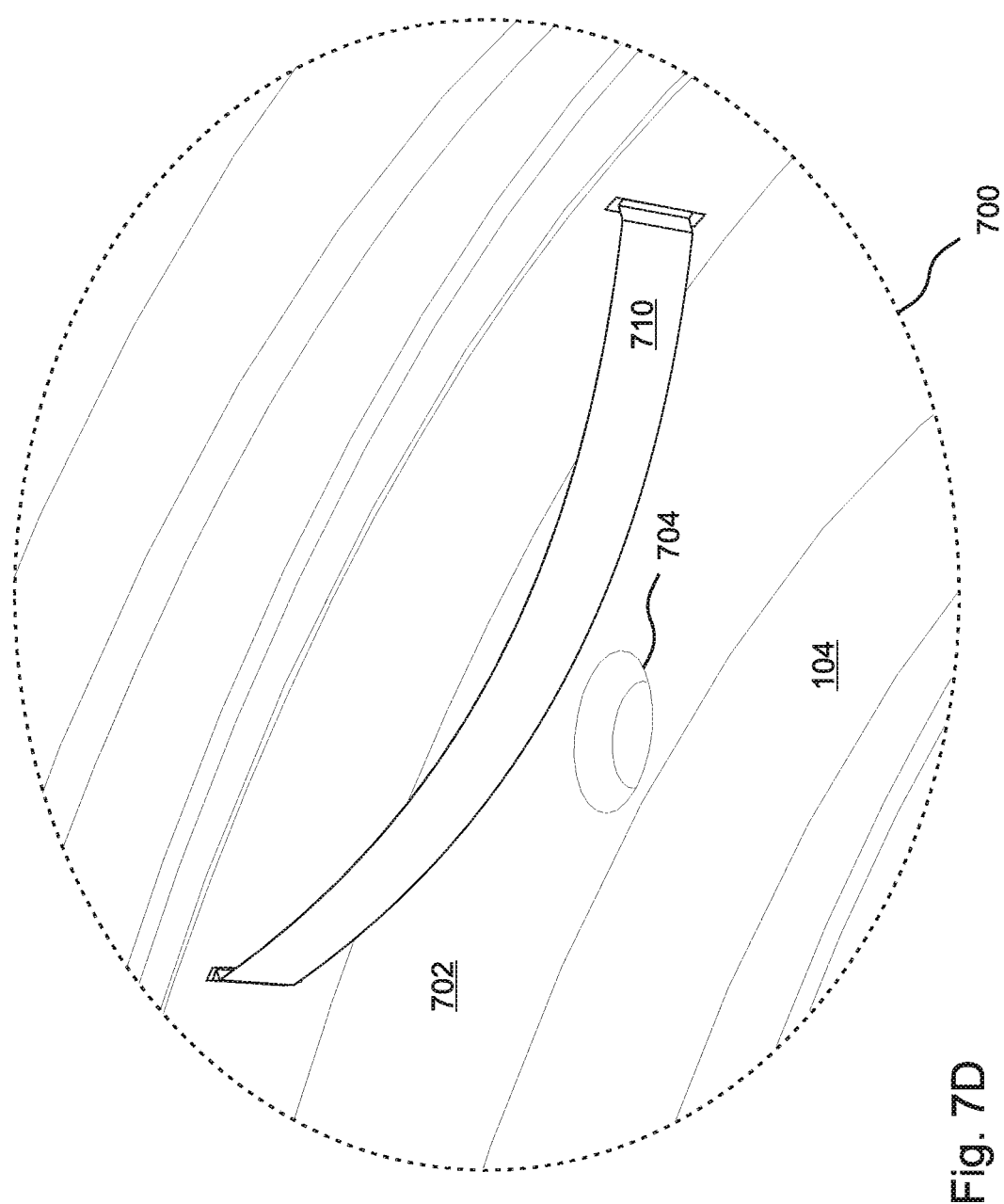
FIG. 7D is a perspective close-up view drawn to scale of a region of the housing half of FIG. 7A showing a flexible alignment component installed therein, where the flexible alignment member is a horizontal leaf spring.

Similarly, in the embodiment of FIG. 7C, the flexible alignment component is a bent, vertical leaf spring 708, and in the embodiment of FIG. 7D it is a horizontal leaf spring 710. In the embodiments of FIGS. 7C and 7D, as the housing halves 104 are brought together, the leaf springs 708, 710 are pressed flat against the vertical wall of the seat 702 and fit into grooves provided in the vertical sides of the split rings 102 (not shown). In similar embodiments, grooves for the leaf springs are provided in the vertical walls of the seat 702.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

We claim:

1. A mechanism that is a split ring seal assembly, the mechanism comprising:
    a seal ring that is split into first and second split ring halves; a housing that is split into first and second housing halves, the housing halves including respective first and second ring seat halves into which the seal ring halves can be respectively seated;
    an elastomeric sealing member split into first and second elastomeric halves that form seals respectively between the first ring half and first housing half, and between the second ring half and the second housing half; and
    a split ring advancing mechanism comprising a flexible alignment component cooperative with the first housing half and in contact with the first split ring half to shift the first split ring half radially inward while the first split ring half remains axially seated in the first ring seat half, so that ends of the first split ring half extend circumferentially beyond corresponding ends of the first ebstomeric half,
    the flexible alignment component being flexible so as to allow the first split ring half to move radially outward into a radially seated configuration as the first and second housing halves are assembled.

2. The mechanism of claim 1, wherein the flexible alignment component is removable from the first housing half after assembly of the first and second housing halves.

3. The mechanism of claim 1, wherein the flexible alignment component includes a base that is attachable to an exterior of the first housing half, a flexible neck extending upward from the base, and a head that is configured to push radially inward against an outer rim of the first split ring half.

4. The mechanism of claim 3, wherein the head includes a projection that is configured to extend over a top of the first split ring half and thereby maintain the first split ring half axially seated in the first ring seat half.

5. The mechanism of claim 3, wherein the head includes a beveled front surface configured to press the first split seal ring half simultaneously in a radially inward and an axially downward direction.

6. The mechanism of claim 3, wherein the head and neck are split vertically into two halves.

7. The mechanism of claim 6, wherein one of the two halves of the head is configured to maintain the first split ring half axially seated in the first ring seat half while the other of the two halves of the head is configured to push the first split seal ring half radially inward.

8. The mechanism of claim 1, wherein the flexible alignment component extends within a space between an outer rim of the first split seal ring half and an inner wall of the first ring seat half.

9. The mechanism of claim 8, wherein the flexible alignment component is a coil spring.

10. The mechanism of claim 8, wherein the flexible alignment component is a vertical leaf spring.

11. The mechanism of claim 8, wherein the flexible alignment component is a horizontal leaf spring.

12. The mechanism of claim 1, further comprising a second flexible alignment component cooperative with the second housing half.

13. The mechanism of claim 1, wherein the split ring seal assembly is a rotor split ring seal assembly.

14. The mechanism of claim 1, wherein the split ring seal assembly is a stator split ring seal assembly.

15. The mechanism of claim 1, wherein the flexible alignment component is not removable from the mechanism after assembly of the first and second housing halves.

* * * * *

UNITED STATES PATENT AND TRADEMARK OFFICE
CERTIFICATE OF CORRECTION

PATENT NO. : 10,935,140 B2
APPLICATION NO. : 16/474607
DATED : March 2, 2021
INVENTOR(S) : Glenn Robert Owens, Jr. et al.

It is certified that error appears in the above-identified patent and that said Letters Patent is hereby corrected as shown below:

In the Claims

Column 8 Line 21 ebstomeric should be elastomeric

Signed and Sealed this
Thirteenth Day of June, 2023

Katherine Kelly Vidal
*Director of the United States Patent and Trademark Office*